United States Patent
Yang et al.

(10) Patent No.: US 12,476,491 B2
(45) Date of Patent: Nov. 18, 2025

(54) DETECTION SIGNAL, WIRELESS CHARGING METHOD AND WIRELESS CHARGING DEVICE

(71) Applicant: Delta Electronics (Shanghai) Co., Ltd., Shanghai (CN)

(72) Inventors: Shengyi Yang, Shanghai (CN); Bin Li, Shanghai (CN); Yayu Li, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 794 days.

(21) Appl. No.: 17/810,345

(22) Filed: Jul. 1, 2022

(65) Prior Publication Data
US 2023/0035613 A1    Feb. 2, 2023

(30) Foreign Application Priority Data
Jul. 21, 2021   (CN) .......................... 202110827157.1

(51) Int. Cl.
| H02J 50/12 | (2016.01) |
| H02J 7/00 | (2006.01) |
| H02J 50/80 | (2016.01) |
| H02J 50/90 | (2016.01) |

(52) U.S. Cl.
CPC .......... H02J 50/12 (2016.02); H02J 7/00045 (2020.01); H02J 50/80 (2016.02); H02J 50/90 (2016.02)

(58) Field of Classification Search
CPC .. H02J 50/12; H02J 50/80; H02J 50/90; H02J 7/00045
USPC .................................................. 320/106, 108
See application file for complete search history.

(56) References Cited

U.S. PATENT DOCUMENTS

| 9,065,489 B2 * | 6/2015 | Mach | H02J 50/12 |
| 9,762,091 B2 * | 9/2017 | Oosumi | H02J 50/90 |
| 10,530,426 B2 | 1/2020 | Park | |
| 11,005,294 B2 | 5/2021 | Kang et al. | |
| 11,764,619 B2 * | 9/2023 | Li | H02J 50/10 |
| | | | 307/104 |
| 2016/0336807 A1 | 11/2016 | Mach et al. | |
| 2019/0148987 A1 * | 5/2019 | Jung | H04B 5/79 |
| | | | 307/104 |

FOREIGN PATENT DOCUMENTS

| CN | 106100154 A | 11/2016 |
| CN | 107534324 A | 1/2018 |
| CN | 109196753 A | 1/2019 |
| CN | 109560621 A | 4/2019 |
| CN | 106471709 B | 7/2019 |

* cited by examiner

*Primary Examiner* — Richard V Muralidar
(74) *Attorney, Agent, or Firm* — CKC & Partners Co., LLC

(57) ABSTRACT

The disclosure provides a detection signal for detecting a power receiving device in wireless charging, wherein the detection signal is configured to wake up the power receiving device in a wireless charging field, and cause the power receiving device to generates a feedback signal based on a modulation wave of about 2 kHz; a duration time of the detection signal is greater than 1 millisecond and less than 65 milliseconds; and the detection signal is configured to identify the modulation wave. The disclosure further provides a wireless charging method for a wireless charging device using the detection signal, and a wireless charging device using the detection signal.

15 Claims, 6 Drawing Sheets

DETECTION SIGNAL, WIRELESS CHARGING METHOD AND WIRELESS CHARGING DEVICE

CROSS-REFERENCE TO RELATED APPLICATIONS

This non-provisional application claims priority under 35 U.S.C. § 119(a) on Patent Applications No. 202110827157.1 filed in P.R. China on Jul. 21, 2021, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The disclosure relates to the field of wireless charging, and in particular, a detection signal for detecting a power receiving device in wireless charging, a wireless charging method for a wireless charging device using the detection signal, and a wireless charging device using the detection signal.

BACKGROUND

The wireless charging technology becomes mature after more than ten years of development, and application also becomes extensive. In particular, the current in-vehicle wireless charging gets appreciated by more and more car manufacturers. However, under the background that currently, more and more car manufacturers use wireless communication tag (e.g., NFC card or RFID card) as a car key, in order to protect such car key, for example the NFC card, from being damaged by the in-vehicle wireless charging device, NFC detection system often shall be triggered in an orderly manner to detect the NFC card.

Currently, the wireless charging device often uses a detection signal (which is also referred to as Ping) to detect whether a power receiving device such as mobile phone is in a wireless charging field of the wireless charging device. Based on Qi wireless charging protocol, as shown in FIG. 1, analog Ping and digital Ping are often used as detection signals to detect the power receiving device.

The analog Ping has a very short duration time which is less than 50 microseconds (μs), and a voltage is 5V which can be adjusted according to specific application. The analog Ping uses a short duration time to ensure not to wake up the power receiving device, and identify whether an object is present in the wireless charging field of the wireless charging device by judging signal change of the wireless charging device transmitting the analog Ping, but cannot accurately identify whether the object in the wireless charging field is the power receiving device.

A duration time of the digital Ping is 65 milliseconds (ms) or more and 70 ms or less. Accordingly, the digital Ping having a longer duration time can supply energy to wake up the power receiving device. When the power receiving device is woken up, the power receiving device transmits an ASK signal as a feedback signal, and information content of the feedback signal includes basic information of the power receiving device. The duration time of the digital Ping is sufficient long, such that the wireless charging device can acquire basic information of the power receiving device included in the feedback signal of the power receiving device for subsequent wireless charging function. Therefore, the digital Ping not only determines whether the object in the wireless charging field is the power receiving device, but also determines basic information of the power receiving device.

Currently, detection of the power receiving device and detection of the wireless communication tag in wireless charging are carried out in a time-sharing manner. As shown in FIG. 2, in some time periods of operation of the wireless charging device, the wireless charging device periodically alternates the function of detecting the power receiving device using the digital Ping and function of detecting the wireless communication tag, but such operation results in a blind zone in detection of the wireless communication tag. For example, if the power receiving device and the wireless communication tag are placed in the wireless charging field immediately after the function of detecting the wireless communication tag is executed, then the digital Ping transmitted thereafter will detect presence of the power receiving device, and directly start the wireless charging function to supply power to the power receiving device without performing subsequent function of detecting the wireless communication tag. At this time, energy supplied by the wireless charging device may damage the wireless communication tag. Moreover, since the duration time of the digital Ping is between 65 ms and 70 ms, energy consumption is relatively high, and there is also a risk of damaging the wireless communication tag. Furthermore, since detection of the wireless communication tag and the digital Ping are triggered continuously and alternatively when the wireless charging device is in standby mode, standby power consumption of the wireless charging device is large, and a charging response speed is slow.

Therefore, the existing wireless charging method and the wireless charging device shall be improved in order to prevent a blind zone in detection of the wireless communication tag, and avoid the wireless communication tag from being damaged while reducing the standby power consumption of the wireless charging device, and improving the charging response speed.

SUMMARY

An object of the disclosure is to improve the existing wireless charging method and the wireless charging device, in order to prevent a blind zone in detection of the wireless communication tag, avoid the wireless communication tag from being damaged while reducing standby power consumption of the wireless charging device, and improving a charging response speed.

According to one aspect of the disclosure, a detection signal for detecting a power receiving device in wireless charging is provided, wherein the detection signal is configured to wake up the power receiving device in a wireless charging field, and cause the power receiving device to generate a feedback signal based on a modulation wave of about 2 kHz; a duration time of the detection signal is greater than 1 ms and less than 65 ms; and the detection signal is configured to identify the modulation wave.

Optionally, in some embodiments of the detection signal, the detection signal does not identify an information content of the feedback signal.

According to another aspect of the disclosure, a wireless charging method for a wireless charging device is provided, comprising: transmitting a first detection signal to detect presence of a power receiving device in a wireless charging field; and when the power receiving device is detected in the wireless charging field, detecting presence of wireless communication tag in the wireless charging field, wherein the first detection signal is configured to wake up the power receiving device in the wireless charging field, and cause the power receiving device to generate a feedback signal based on a modulation wave of about 2 kHz; a duration time of the first detection signal is greater than 1 ms and less than 65 ms; and the first detection signal is configured to identify the modulation wave.

Optionally, in some embodiments of the wireless charging method, the first detection signal does not identify an information content of the feedback signal.

Optionally, in some embodiments of the wireless charging method, the method further comprises: periodically transmitting a second detection signal different from the first detection signal before transmitting the first detection signal, to detect presence of an object in the wireless charging field; and when the object is detected in the wireless charging field, executing the step of transmitting the first detection signal to determine whether the object is the power receiving device, wherein the second detection signal is an analog Ping.

Optionally, in some embodiments of the wireless charging method, the method periodically transmits the first detection signal to detect presence of the power receiving device in the wireless charging field.

Optionally, in some embodiments of the wireless charging method, the method further comprises: when the wireless communication tag is not detected in the wireless charging field, transmitting a third detection signal to wake up the power receiving device to cause the power receiving device to generate the feedback signal, identifying an information content of the feedback signal, and starting wireless charging function to supply power to the power receiving device, wherein the third detection signal is a digital Ping; and when the wireless communication tag is detected in the wireless charging field, not starting the wireless charging function until the wireless communication tag is removed.

According to yet another aspect of the disclosure, a wireless charging device is provided, comprising: a power transmission unit having a transmission coil for supplying power to a power receiving device in a wireless charging field; a wireless communication unit for detecting presence of wireless communication tag in the wireless charging field, and communicating with the wireless communication tag; and a controller configured to: cause the power transmission unit to transmit a first detection signal to detect presence of the power receiving device in the wireless charging field, and when the power receiving device is detected in the wireless charging field, cause the wireless communication unit to detect presence of the wireless communication tag in the wireless charging field, wherein the first detection signal is configured to wake up the power receiving device in the wireless charging field, and cause the power receiving device to generate a feedback signal based on a modulation wave of about 2 kHz; a duration time of the first detection signal is greater than 1 ms and less than 65 ms; and the first detection signal is configured to identify the modulation wave.

Optionally, in some embodiments of the wireless charging device, the first detection signal does not identify information content of the feedback signal.

Optionally, in some embodiments of the wireless charging device, the controller is further configured to: cause the power transmission unit to periodically transmit a second detection signal before the first detection signal is transmitted, to detect presence of an object in the wireless charging field; and when the object is detected in the wireless charging field, cause the power transmission unit to transmit the first detection signal to determine whether the object is the power receiving device, wherein the second detection signal is an analog Ping.

Optionally, in some embodiments of the wireless charging device, the controller is further configured to control the power transmission unit to periodically transmit the first detection signal to detect presence of the power receiving device in the wireless charging field.

Optionally, in some embodiments of the wireless charging device, when the wireless communication unit does not detect the wireless communication tag in the wireless charging field, the power transmission unit is controlled to transmit a third detection signal to wake up the power receiving device, such that the power receiving device generates the feedback signal, identify the information content of the feedback signal, and start wireless charging function to supply power to the power receiving device, wherein the third detection signal is a digital Ping; and when the wireless communication unit detects the wireless communication tag in the wireless charging field, the power transmission unit is prevented from starting the wireless charging function until the wireless communication tag is removed.

Based on the detection signal provided in the disclosure, the wireless charging method and the wireless charging device can prevent a blind zone in detection of the wireless communication tag, avoid the wireless communication tag from being damaged while reducing standby power consumption of the wireless charging device, and improving a charging response speed.

BRIEF DESCRIPTION OF THE DRAWINGS

The exemplary embodiments are described in details with reference to the accompanying drawings, through which the above and other features and advantages of the disclosure will become more apparent.

DETAILED DESCRIPTION

Figure 1:
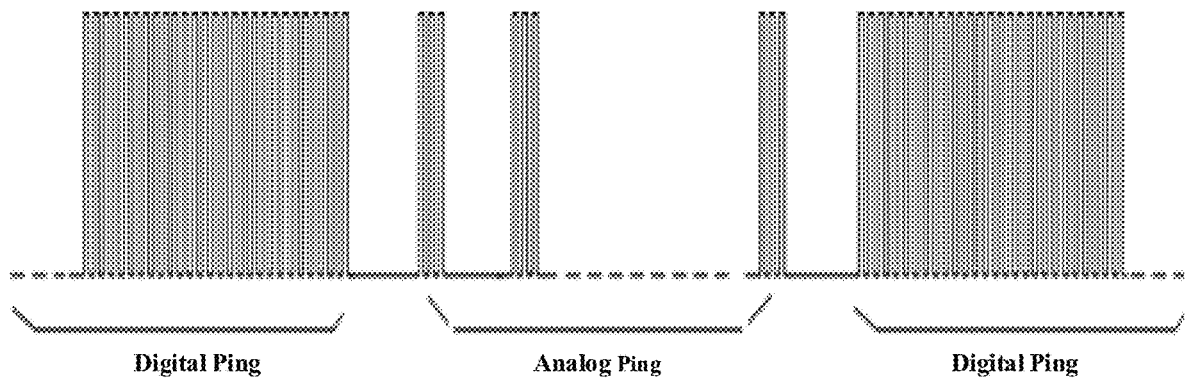
FIG. 1 illustrates a detection signal for detecting a power receiving device in the prior art.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this disclosure will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. In addition, the terms "first", "second" and the like in the claims are only used as signs, instead of numeral limitations to objects.

As is stated previously, existing detection of the power receiving device is achieved by periodically transmitting a digital Ping. However, only the digital Ping, transmitted at the time when the power receiving device is found, is used to acquire information content included in a feedback signal transmitted by the power receiving device, to establish communication handshake between the power receiving device and a wireless charging device. Other digital Pings transmitted at other time are only used to determine whether the power receiving device is in a wireless charging field, and thus not all digital Pings are used to acquire information of the power receiving device.

As is discussed above, a duration time of the digital Ping is between 65 ms and 70 ms, such that the digital Ping can supply energy to wake up the power receiving device. Moreover, the duration time of the digital Ping is sufficient long, such that the wireless charging device can acquire basic information of the power receiving device included in the feedback signal transmitted by the power receiving device. In other words, although it is not required to use all digital Ping transmitted in all time periods to acquire information of the power receiving device, as along as a digital Ping is transmitted, the wireless charging device must wait at least 65 ms, and must consume the energy used for the digital Ping to acquire the information content of the feedback signal. Accordingly, use of the digital Ping causes a large power consumption when the wireless charging device is in standby mode, and a slow response speed of the wireless charging device when the power receiving device is placed in the wireless charging field. Moreover, a high power output of the digital Ping may damage a wireless communication tag placed in the wireless charging field.

As is discussed above, a duration time of an analog Ping is less than 50 ms to ensure that the power receiving device is not woken up, a duration time of the digital Ping is between 65 ms and 70 ms, which is sufficient to wake up the power receiving device such that the power receiving device transmits a feedback signal encoded with an ASK signal, and the duration time of the digital Ping is sufficient long such that the information content included in the feedback signal can be further acquired.

Based on Qi wireless charging protocol, communication mode used in wireless charging is a communication using a modulation wave of 2±4% kHz, so the ASK signal encoded feedback signal transmitted by the woken power receiving device is achieved based on the modulation wave of 2±4% kHz.

The table 1 below illustrates a main structure of a communication packet of the feedback signal of the power receiving device.

TABLE 1

Main Structure of Communication Packet of the Feedback Signal

| Prefix | Packet Header | Information | Check information |
| --- | --- | --- | --- |

As is described by the table 1, the communication package of the ASK signal encoded feedback signal of the power receiving device mainly has four portions including prefix, package header, information and check information, and is transmitted based on the modulation wave of 2±4% kHz, the prefix portion is formed by 11 to 25 codes "1", and the information portion includes basic information of the power receiving device.

According to one embodiment of the disclosure, the disclosure provides a detection signal for detecting whether the power receiving device is present in the wireless charging field in the wireless charging device, and hereinafter the detection signal provided in the disclosure is referred to as "a device detection signal" or "a device detection Ping (DD Ping)". The DD Ping is different from the analog Ping and the digital Ping in the Qi wireless charging protocol. A duration time of the DD Ping may be greater than 50 ms and less than 65 ms. More particularly, the duration time of the DD Ping may be greater than 1 ms and less than 65 ms, and the duration time of the DD Ping may be set by a program or a firmware stored in the wireless charging device. Moreover, the DD Ping is configured to identify the modulation wave of about 2 kHz, such as, the modulation wave of 2±4% kHz. Since the feedback signal transmitted by the power receiving device is based on the modulation wave of about 2 kHz, once the DD Ping determines the modulation wave of about 2 kHz in the wireless charging field, it can be determined that the modulation wave is transmitted by the power receiving device, thereby determining presence of the power receiving device in the wireless charging field.

The duration time of the DD Ping is greater than the duration time of the analog Ping (about 50 ms), so the energy transmitted by DD Ping may sufficient to wake up the power receiving device in the wireless charging field, such that the power receiving device begins to transmit the feedback signal based on the modulation wave of about 2 kHz. The duration time of the DD Ping is less than the duration time of the digital Ping (about 65 ms). Accordingly, the DD Ping is configured to determine whether the power receiving device is present in the wireless charging field by determining an extremely few portion of information in the prefix portion of the feedback signal transmitted by the power receiving device. For example, once the DD Ping determines 1 to 2 codes "1" in the prefix portion transmitted based on the modulation wave of about 2 kHz, it can determine that the power receiving device is present in the wireless charging field. Optionally, the DD Ping may completely ignore any information content in the feedback signal transmitted by the power receiving device. Accordingly, as compared to the analog Ping, the DD Ping may accurately identify the power receiving device, and as compared to the digital Ping, the duration time of the DD Ping is sufficient short not to identify information content of the feedback signal, i.e., specific information content in the communication package of the feedback signal, for example, basic information of the power receiving device. The use of the DD Ping allows the wireless charging device to have a faster response speed, and less energy consumption.

Figure 3:
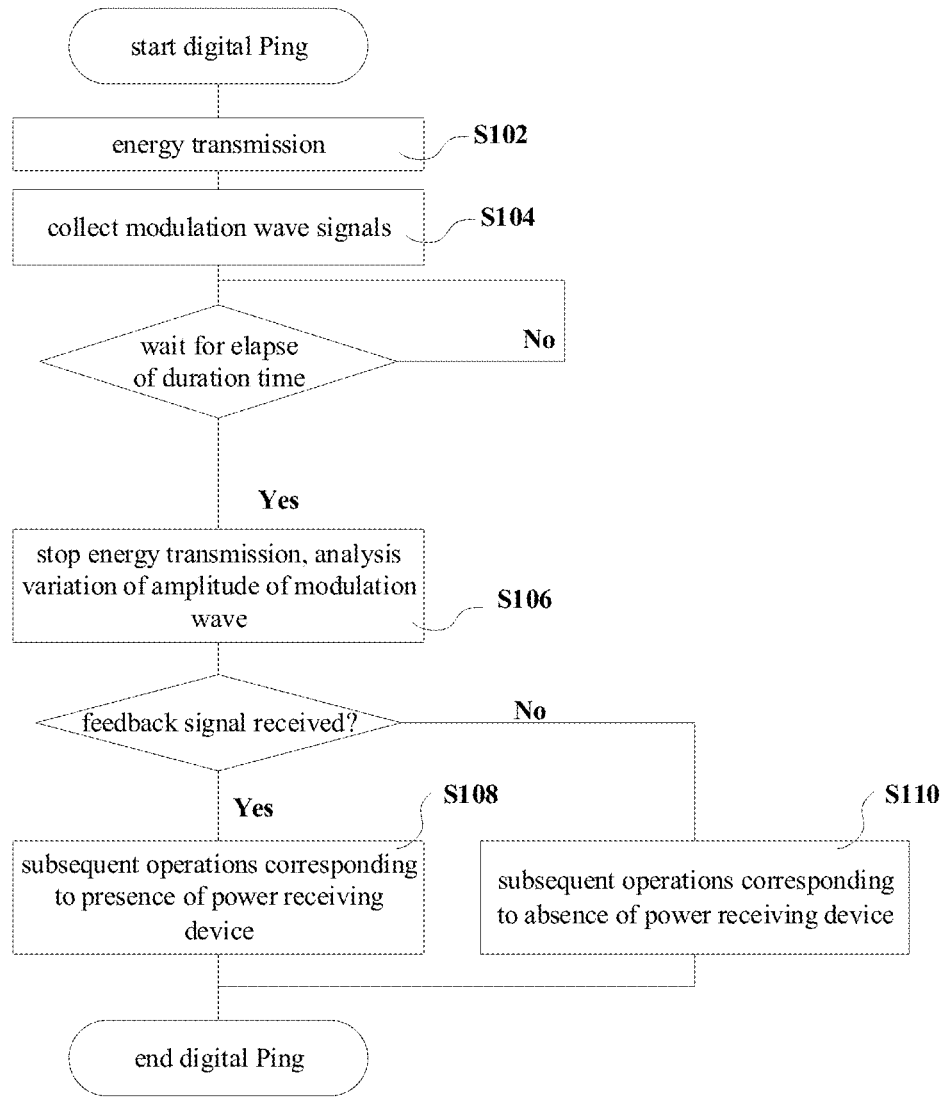
FIG. 3 illustrates a working flow of a digital Ping.

FIG. 3 illustrates a working flow of the digital Ping based on Qi charging protocol. As shown in FIG. 3, when the digital Ping is started, in step S102, the wireless charging device starts energy transmission, if the power receiving device is present in the wireless charging field, the power receiving device is woken up by the transmitted energy, and transmits the feedback signal based on the modulation wave of about 2 kHz. Next, in step S104, the wireless charging device attempts to collect a modulation wave signal in the wireless charging field. At this time, since the duration time of the digital Ping is 65 ms or more and 70 ms or less, the wireless charging device shall wait for time lapse of at least 65 ms. After the duration time of the digital Ping ends, in step S106, the wireless charging device stops energy transmission, and begins to analyze variation of an amplitude of the modulation wave to determine whether the feedback signal transmitted from the power receiving device is identified. At this time, if the wireless charging device identifies the feedback signal transmitted from the power receiving device, subsequent operations corresponding to the presence of the power receiving device are further executed in step S108, and the digital Ping is stopped after completion of the subsequent operations, or if the wireless charging device does not identify the feedback signal transmitted from the power receiving device, the subsequent operations corresponding to the absence of the power receiving device are executed in step S110, and the digital Ping is stopped after completion of the subsequent operations.

Figure 4:
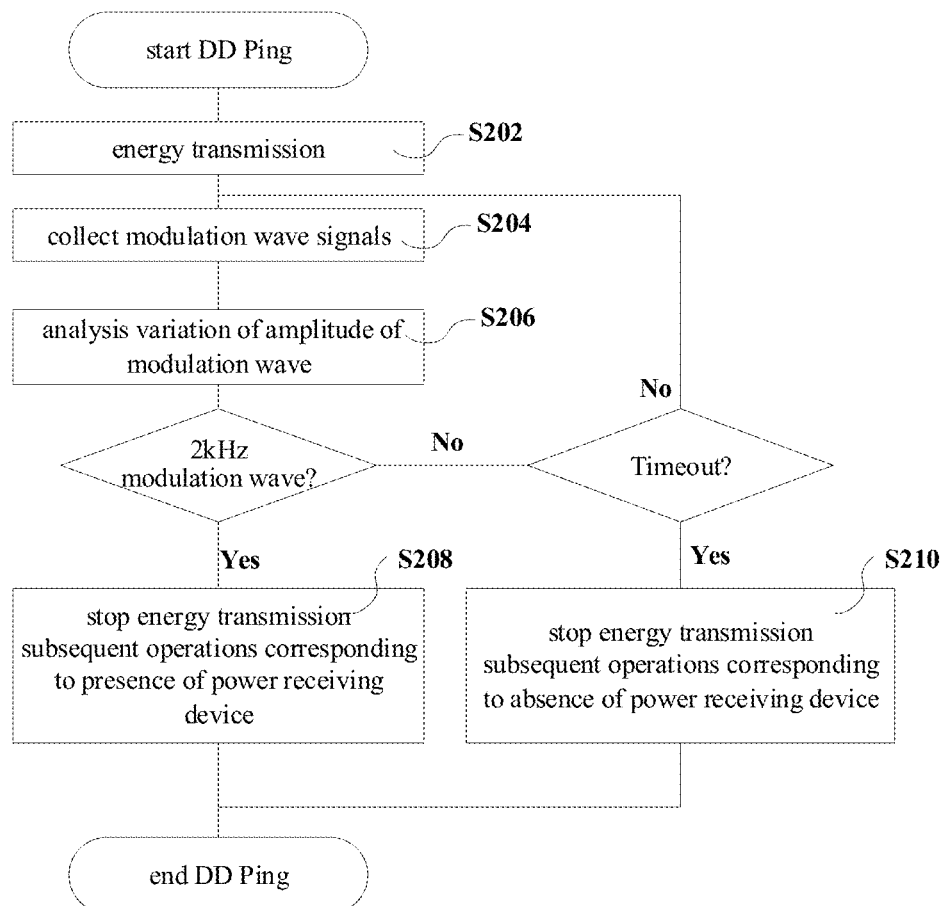
FIG. 4 illustrates a working flow of a DD Ping according to one embodiment of the disclosure.

FIG. 4 illustrates a working flow of the DD Ping provided in the disclosure. As shown in FIG. 4, when the DD Ping is started, in step S202, the wireless charging device starts energy transmission, and if the power receiving device is present in the wireless charging field, the power receiving device is woken up by the transmitted energy, and transmits the feedback signal based on the modulation wave of about 2 kHz. Then, in step S204, the wireless charging device attempts to collect a modulation wave signal in the wireless charging field. Next, in step S206, the wireless charging device analyzes variation of an amplitude of the modulation wave to determine whether the modulation wave of about 2 kHz is identified. At this time, if the wireless charging device identifies the modulation wave of about 2 kHz, the wireless charging device determined the presence of the power receiving device in the wireless charging field, then the energy transmission is closed and the subsequent operations corresponding to the presence of the power receiving device is present can be performed in step S208, without waiting for end of the duration time of the DD Ping. The DD Ping is stopped after completion of the subsequent operations. Alternatively, if the wireless charging device does not identify the modulation wave of about 2 kHz, the wireless charging device can continuously identify the modulation wave of about 2 kHz within the duration time of the DD Ping, and if the wireless charging device does not identify the modulation wave of about 2 kHz within the entire duration time of the DD Ping, in step S210, the energy transmission can be closed, then subsequent operations corresponding to the absence of the power receiving device are performed. The DD Ping is stopped after completion of the subsequent operations.

As compared to the working flow of the digital Ping illustrated in FIG. 3, advantages of the working flow of the DD Ping illustrated in FIG. 4 lie in:

(1) the step of waiting for elapse of the duration time in the working process of the digital Ping does not exist. In the working process of the DD Ping, once the DD Ping identifies the modulation wave of about 2 kHz, the wireless charging device can directly close energy transmission, and then execute subsequent operations corresponding to the presence of the power receiving device. Even if the DD Ping does not identify the modulation wave of about 2 kHz at the beginning, the time for timeout determination (i.e., the duration time of the DD Ping) is also less than the duration time of the digital Ping. Therefore, based on the working process of the DD Ping, the wireless charging device allows a faster response speed to the power receiving device.

(2) the step of "determining whether a feedback signal from the power receiving device is received" in the working process of the digital Ping does not exist. In the working process of the DD Ping, it only identifies whether the wireless charging field has the modulation wave of about 2 kHz, and does not further identify information content of the feedback signal, so the wireless charging device does not consume energy for identifying the information content of the feedback signal, and power consumption is smaller.

Figure 5A:
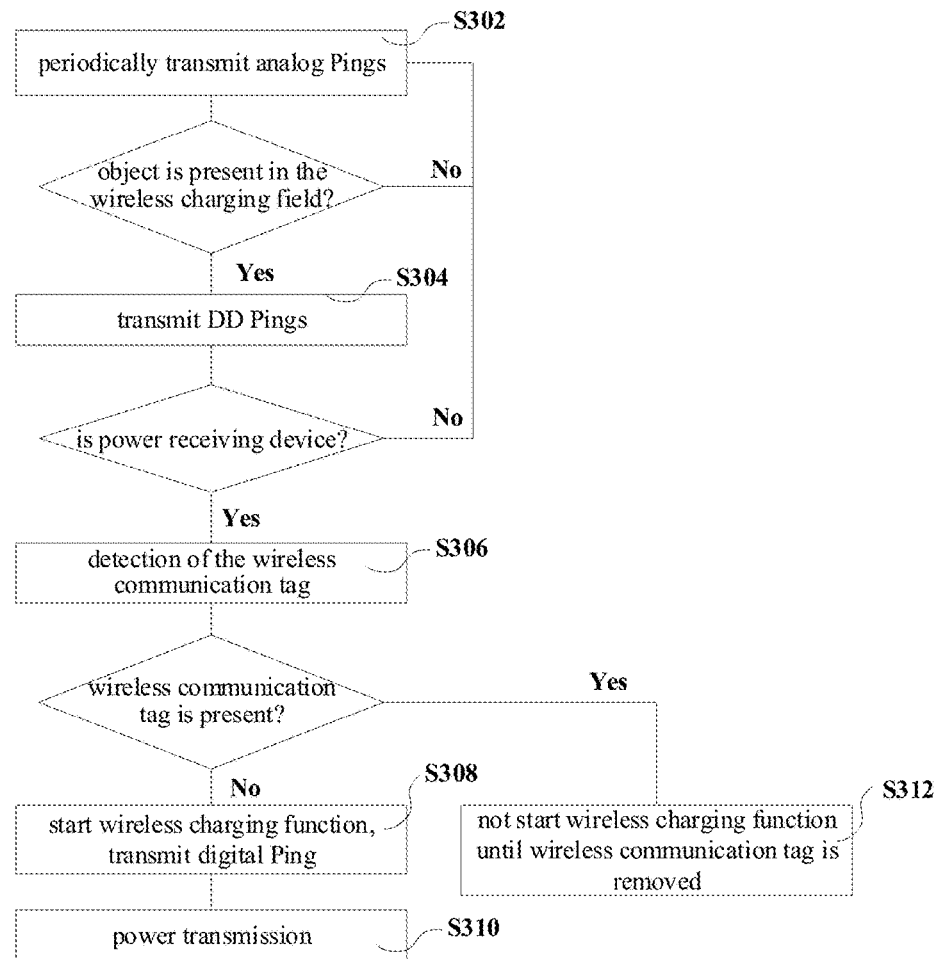
FIG. 5A illustrates a wireless charging method using the DD Ping according to one embodiment of the disclosure.
Figure 5B:
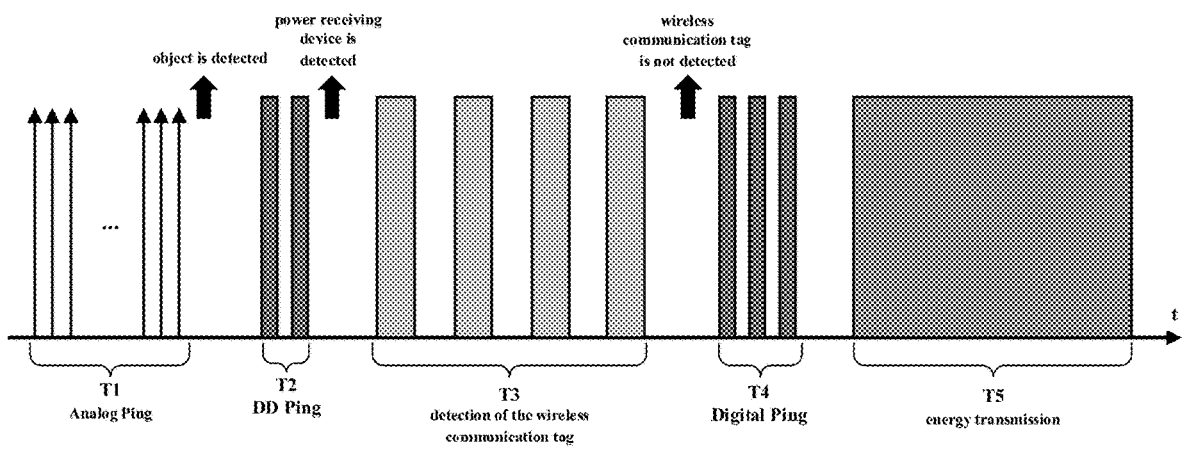
FIG. 5B illustrates a timing sequence of the wireless charging method of FIG. 5A.

FIG. 5A illustrates a flow diagram of a wireless charging method of the DD Ping provided in the disclosure according to one embodiment, and FIG. 5B illustrates a timing sequence of the wireless charging method of FIG. 5A. Hereinafter description is made with reference to FIGS. 5A and 5B.

Figure 2:
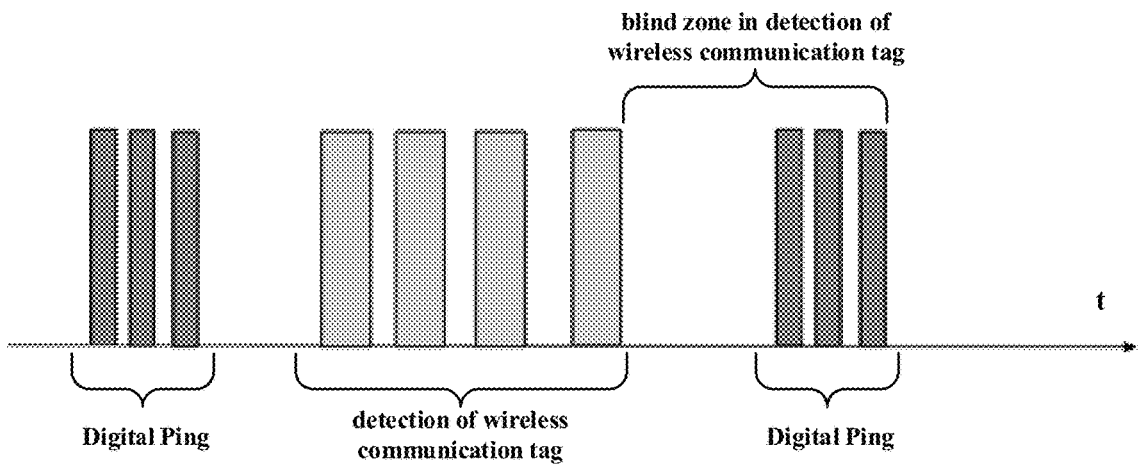
FIG. 2 illustrates a timing sequence of detection function of a power receiving device and detection function of a wireless communication tag in the prior art.

In step S302, the wireless charging device periodically transmits analog Pings to detect whether an object is present in the wireless charging field. Optionally, similarly with description of the time-sharing detection function in FIG. 2, during periodically transmission of the analog Pings, after each analog Ping is transmitted or a group of analog Pings are transmitted, detection of wireless communication tag (e.g., NFC card or RFID card) is executed to detect whether the wireless communication tag is present in the wireless charging field. When the wireless communication tag is present, the wireless charging device may stop periodically transmitting the analog Pings, then execute the function of communication with the wireless communication tag. Optionally, during periodically transmission of the analog Pings, the DD Pings can be transmitted at a predetermined time interval to prevent the case of missed detection caused by the analog Pings.

When the analog Ping transmitted by the wireless charging device detects presence of the object in the wireless charging field, in step S304, the wireless charging device transmits the DD Ping to detect whether the object is the power receiving device such as mobile phone. For example, as shown in FIG. 5B, when the object is detected by the analog Ping transmitted at a time period T1, then the DD Pings may be transmitted in a following time period T2 to detect whether the object is the power receiving device. Since the DD Ping has a short duration time, and only identifies the modulation wave of about 2 kHz, the DD Ping has a faster response speed, and smaller power consumption.

When the transmitted DD Pings cannot identify the modulation wave of about 2 kHz within the duration time, it is considered that the object detected by the analog Ping is not the power receiving device, and returns to step S302 to continue to periodically transmit the analog Pings. When the transmitted DD Pings identify the modulation wave of about 2 kHz within the duration time, it is considered that the object detected by the analog Ping is the power receiving device. At this time and in step S306, the detection function of the wireless communication tag is executed to determine whether the wireless communication tag is also present in the wireless charging field before starting the charging function to charge the power receiving device. For example, as shown in FIG. 5B, when the DD Pings transmitted in the time period T2 identify the modulation wave of about 2 kHz, and determine presence of the power receiving device, the detection function of the wireless communication tag is executed firstly in a time period T3 to determine whether the wireless communication tag is also present in the wireless charging field. Detection of the wireless communication tag uses another detection means, which is different from that of the DD Ping.

When the detection function of the wireless communication tag executed in the step S306 does not detect the wireless communication tag, in step S308, the wireless charging device starts wireless charging function, and transmits the digital Ping to wake up the power receiving device and causes the power receiving device to generate a feedback signal, then the power charging device identifies basic information of the power receiving device in the feedback signal, and establishes communication handshake between the power receiving device and the wireless charging device based on the basic information. Then, in step S310, supplying power to the power receiving device. For example, as shown in FIG. 5B, when the detection function of the wireless communication tag executed in the time period T3 does not detect the wireless communication tag, then the wireless charging function is started and the digital Ping is transmitted in a following time period T4. The transmitted digital Ping wakes up the power receiving device in the wireless charging field, acquires the feedback signal from the power receiving device, and establishes communication handshake based on the feedback signal, and finally, large power energy is transmitted to the power receiving device at a time period T5 to charge the power receiving device.

When the detection function of the wireless communication tag executed in the step S306 detects the wireless communication tag, then in step S312, the wireless charging device can execute other functions to communicate with the wireless communication tag. Additionally or alternatively, the wireless charging device also can output information indicative of detection of the wireless communication tag to users in order not to start the wireless charging function before the wireless communication tag is removed.

According to the wireless charging method described in FIGS. 5A and 5B, the detection function of the wireless communication tag is firstly performed when the power receiving device is detected, to detect whether both the wireless communication tag and the power receiving device are present in the wireless charging field, such that the digital Ping is transmitted to acquire basic information of the power receiving device to charge the power receiving device only if the power receiving device while no wireless communication tag is present in the wireless charging field. Accordingly, a blind zone in detection of the wireless communication tag in the prior art that alternatively performs the detection function of the power receiving device and the detection function of the wireless communication tag in a time-sharing manner may be avoided, thereby avoiding the risk of wireless charging device damaging the wireless communication tag. Moreover, the method provided in the disclosure, instead of the existing time-sharing detection operation, periodically transmits the analog Pings and periodically executes the detection function of the wireless communication tag, or periodically transmits a combination of the analog Pings and the DD Pings and periodically executes the detection function of the wireless communication tag, and determines whether the detected object is the power receiving device using the DD Ping instead of digital Ping, As compared to using the digital Ping, the method provided in the disclosure has a faster response speed, and smaller power consumption, and avoids the digital Ping from damaging the wireless communication tag.

Figure 6A:
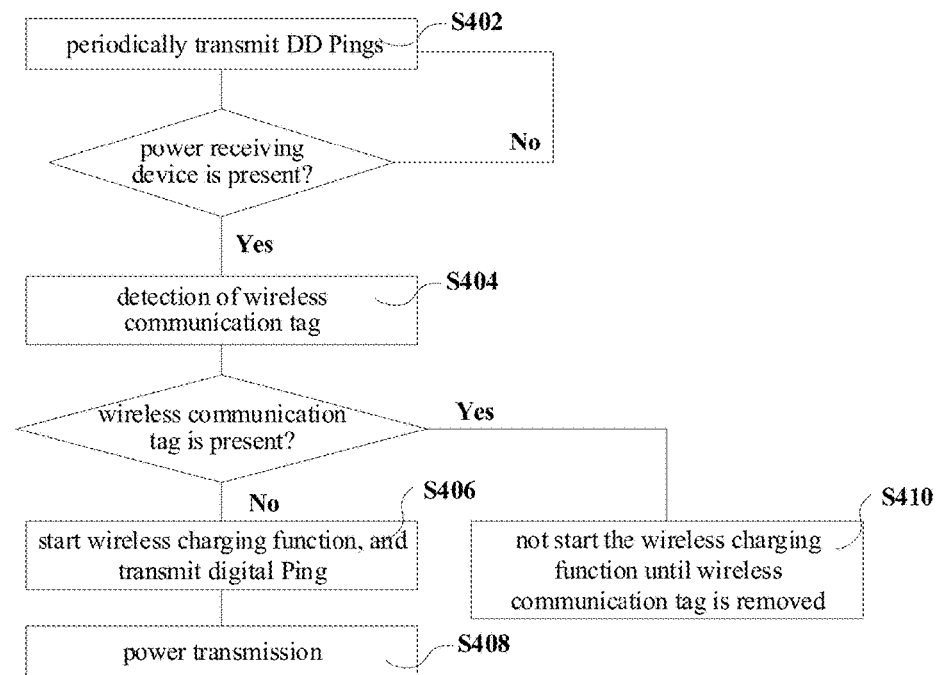
FIG. 6A illustrates a wireless charging method using the DD Ping according to another embodiment of the disclosure.
Figure 6B:
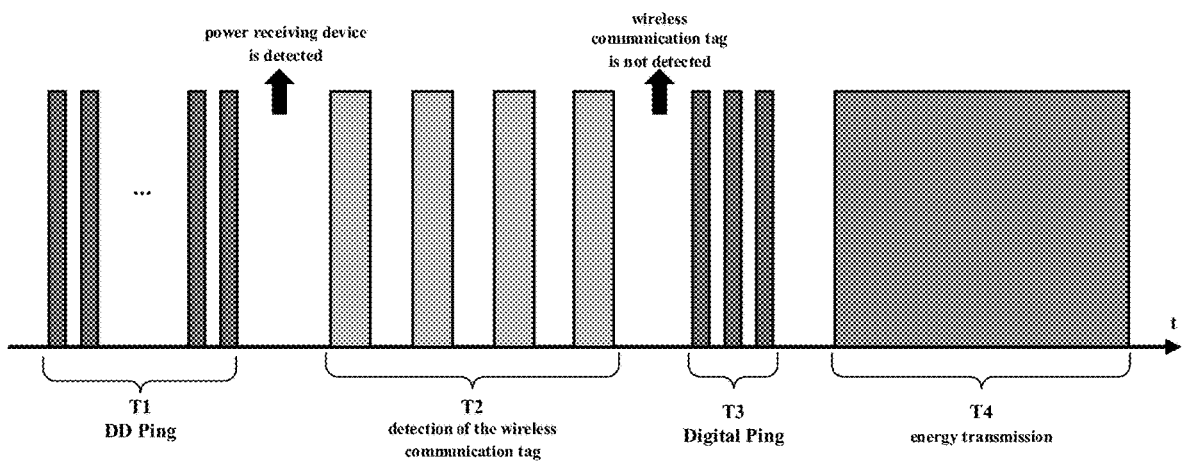
FIG. 6B illustrates a timing sequence of the wireless charging method of FIG. 6A.

FIG. 6A illustrates a flow diagram of a wireless charging method of the DD Ping provided in the disclosure according to another embodiment, and FIG. 6B illustrates a timing sequence of the wireless charging method of FIG. 6A. Hereinafter description is made with reference to FIGS. 6A and 6B.

In step S402, the wireless charging device periodically transmits the DD Pings to detect whether the power receiving device is present in the wireless charging field. Optionally, similarly with description of the time-sharing detection function in FIG. 2, during periodically transmission of the DD Pings, detection of the wireless communication tag (e.g., NFC card or RFID card) is executed after each the DD Ping is transmitted or a group of DD Pings are transmitted, to detect whether the wireless communication tag is present in the wireless charging field. When the wireless communication tag is present, the wireless charging device may stop the subsequent wireless charging function (e.g., stop periodically transmitting the DD Pings), and then execute the function to communicate with the wireless communication tag. Since the DD Ping has a short duration time, and only identifies the modulation wave of about 2 kHz, as compared to the digital Ping, the DD Ping has a faster response speed, and smaller power consumption.

When the transmitted DD Pings cannot identify the modulation wave of about 2 kHz within the duration time, it is considered that the power receiving device is not present in the wireless charging field, and continues to periodically transmit the DD Pings. When the transmitted DD Pings identify the modulation wave of about 2 kHz within the duration time, it is considered that the power receiving device is present in the wireless charging field, and in step S404, the detection function of the wireless communication tag is executed to determine whether the wireless communication tag is also present in the wireless charging field before starting the wireless charging function to charge the power receiving device. For example, as shown in FIG. 6B, when the modulation wave of about 2 kHz is identified by the transmitted DD Pings in the time period T1 for determining presence of the power receiving device, the detection function of the wireless communication tag is executed in the time period T2 to determine whether the wireless communication tag is also present in the wireless charging field.

When the detection function of the wireless communication tag executed in the step S404 does not detect the wireless communication tag, then in step S406, the wireless charging device starts the wireless charging function, and transmits the digital Ping to wake up the power receiving device and cause the power receiving device to generate the feedback signal, and the wireless charging device identifies basic information of the power receiving device in the feedback signal, and establishes communication handshake between the power receiving device and the wireless charging device based on the basic information. Next, in step S408, supplying power to the power receiving device. For example, as shown in FIG. 6B, when the detection function of the wireless communication tag executed in the time period T2 does not detect the wireless communication tag, then the wireless charging function is started, and the digital Ping is transmitted in the following time period T3. The transmitted digital Ping wake ups the power receiving device in the wireless charging field, acquires information content of the feedback signal from the power receiving device, and establishes communication handshake based on the information content of the feedback signal. Finally, large power energy is transmitted to the power receiving device in the time period T4 to charge the power receiving device.

When the detection function of the wireless communication tag executed in the step S404 detects the wireless communication tag, then in step S410, the wireless charging device can execute other functions to communicate with the wireless communication tag. Additionally or alternatively, the wireless charging device may also can output information indicative of detection of the wireless communication tag to users in order not to start the suspended wireless charging function before the wireless communication tag is removed.

According to the wireless charging method described in FIGS. 6A and 6B, the wireless charging function is forcibly suspended when the power receiving device is detected, and then the detection function of the wireless communication tag is performed to detect whether both the wireless communication tag and the power receiving device are present in the wireless charging field, such that the digital Ping is transmitted to acquire basic information of the power receiving device to charge the power receiving device only if the power receiving device is present in the wireless charging field while no wireless communication tag is present in the wireless charging field. Accordingly, a blind zone in detection of the wireless communication tag in the prior art that alternatively executes the detection function of the power receiving device and the detection function of the wireless communication tag in a time-sharing manner may be avoided, thereby avoiding risk of the wireless charging device damaging the wireless communication tag. Moreover, the method provided in the disclosure, instead of the existing time-sharing detection operation, periodically transmits the DD Pings and periodically executes the detection function of the wireless communication tag. As compared to using the digital Ping, the method provided in the disclosure has a faster response speed, and smaller power consumption, and avoids the digital Ping from damaging the wireless communication tag.

Figure 7:
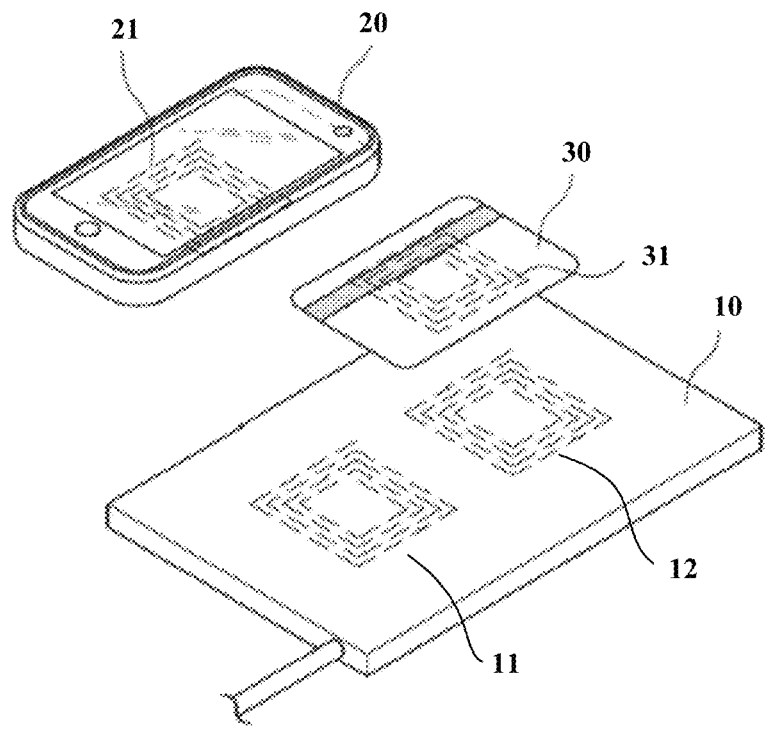
FIG. 7 illustrates a schematic diagram of a wireless charging device according to one embodiment of the disclosure.
Figure 8:
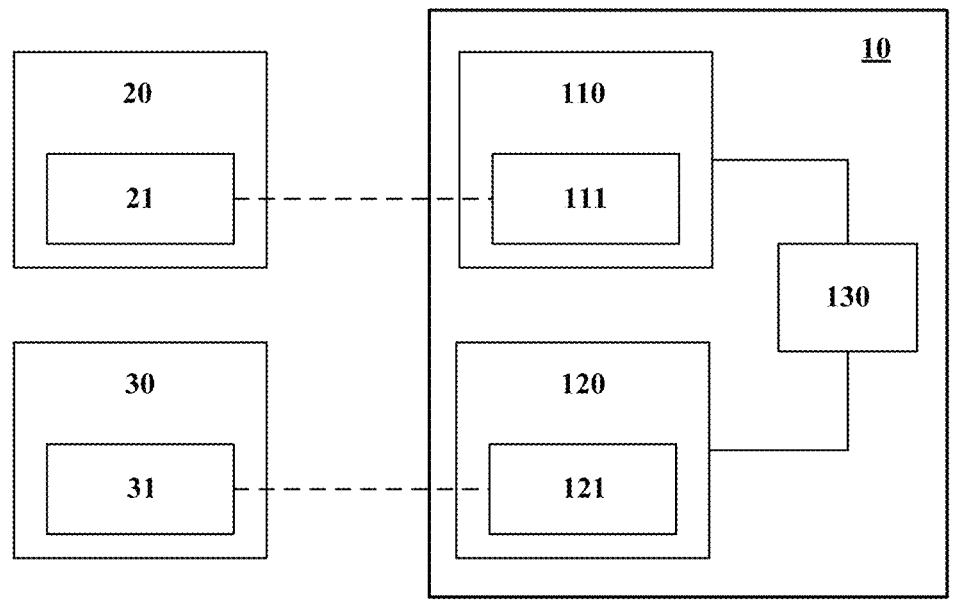
FIG. 8 illustrates a structural diagram of the wireless charging device of FIG. 7.

FIG. 7 illustrates a schematic diagram of a wireless charging device 10 according to one embodiment. FIG. 8 illustrates a structural diagram of the wireless charging device 10.

In FIGS. 7 and 8, the wireless charging device 10 can transmit power wirelessly to a receiving coil 21 of the power receiving device 20 (e.g., mobile phone) via a transmission coil 111 of a power transmission unit 110. In other words, for example, the wireless charging device 10 can include the transmission coil 111 magnetically coupled to the receiving coil 21 to transmit power wirelessly to the power receiving device 20. Moreover, in addition to the power receiving device 20, there may also be a wireless communication tag 30 (e.g., NFC card or RFID card) adjacent to the wireless charging device 10. A communication coil 121 of a wireless communication unit 120 of the wireless charging device 10 is magnetically coupled to a communication coil 31 of the wireless communication tag 30 to transmit information.

A controller 130 of the wireless charging device 10 may be coupled to the power transmission unit 110 and the wireless communication unit 120 to control operations thereof. For example, the controller 130 may have a processor and a memory for storing instructions or programs, and when the processor executes instructions or programs stored on the memory, the processor may control the power transmission unit 110 and the wireless communication unit 120 to execute specific operations.

The controller 130 may control the power transmission unit 110 to transmit the DD Ping described herein to detect whether the power receiving device 20 is present in the wireless charging field. The controller 130 also may control the wireless communication unit 120 to detect whether the wireless communication tag 30 is present in the wireless charging field.

Optionally, the controller 130 can execute the wireless charging method in FIGS. 5A and 5B. That is, the controller 130 may control the transmission coil 111 of the power transmission unit 110 to periodically transmit the analog Pings to detect whether the object is present in the wireless charging field. In the time period when the transmission coil 111 periodically transmits the analog Pings, the controller 130 may control the wireless communication unit 120 to execute detection operation of the wireless communication tag to detect whether the wireless communication tag 30 is present in the wireless charging field after the power transmission unit 110 transmits each analog Ping or a group of analog Pings. When the wireless communication tag is present, the controller 130 may control the power transmission unit 110 to stop periodically transmitting the analog Pings, and control the wireless communication unit 120 to execute the function to communicate with the wireless communication tag 30 via the communication coil 121. Optionally, in the time period when the transmission coil 111 periodically transmits the analog Pings, the controller 130 may control the transmission coil 111 of the power transmission unit 110 to transmit the DD Ping at a predetermined time interval to prevent the case of missed detection caused by the analog Pings.

When the analog Ping transmitted by the transmission coil 111 detects presence of the object in the wireless charging field, the controller 130 may control the transmission coil 111 to transmit the DD Ping to detect whether the object is the power receiving device 20 such as mobile phone. When the DD Pings transmitted by the transmission coil 111 cannot identify the modulation wave of about 2 kHz within the duration time, it is considered that the object detected by the analog Ping is not the power receiving device 20, and the controller 130 may control the transmission coil 111 to continue to periodically transmit the analog Pings.

When the DD Pings transmitted by the transmission coil 111 identify the modulation wave of about 2 kHz within the duration time, it is considered that the object detected by the analog Ping is the power receiving device 20, and the controller 130 controls the wireless communication unit 120 to execute detection function of the wireless communication tag to determine whether the wireless communication tag 30 is also present in the wireless charging field before charging using the power transmission unit 110.

When the wireless communication unit 120 does not detect the wireless communication tag 30, then the controller 130 may control the power transmission unit 110 to start wireless charging function, and transmit the digital Ping through the transmission coil 111 to wake up the power receiving device 20 and cause the power receiving device 20 to generate a feedback signal, and the controller 130 can identify basic information of the power receiving device in the feedback signal, and establish communication handshake between the power receiving device 20 and the power transmission unit 110 based on the basic information. Next, the controller 130 controls the transmission coil 110 to supply power to the power receiving device 20 at a large power.

When the wireless communication unit 120 detects the wireless communication tag 30, then the controller 130 may control the wireless communication unit 120 to execute other functions to communicate with the wireless communication tag 30. Additionally or alternatively, the controller 130 may also output information indicative of detection of the wireless communication tag to users in order not to allow the power transmission unit 110 to start the wireless charging function before the wireless communication tag is removed.

Optionally, the controller 130 may also execute the wireless charging method in FIGS. 6A and 6B. That is, the controller 130 may control the transmission coil 111 of the power transmission unit 110 to periodically transmit the DD Pings to detect whether the power receiving device 20 is present in the wireless charging field. In the period when the transmission coil 111 periodically transmits the DD Pings, the controller 130 may control the wireless communication unit 120 to execute detection operation of the wireless communication tag to detect whether the wireless communication tag 30 is present in the wireless charging field after the power transmission unit 110 transmits each DD Ping or a group of DD Pings. When the wireless communication tag is present, the controller 130 may control the power transmission unit 110 to stop periodically transmitting the DD Pings, and control the wireless communication unit 120 to execute the function to communicate with the wireless communication tag 30 via the communication coil 121.

When the DD Pings transmitted by the transmission coil 111 cannot identify the modulation wave of about 2 kHz within the duration time, it is considered that the power receiving device 20 is not present in the wireless charging field, and the controller 130 may control the transmission coil 111 to continue to periodically transmit the DD Pings.

When the DD Pings transmitted by the transmission coil 111 identify the modulation wave of about 2 kHz within the duration time, it is considered that the power receiving device 20 is present in the wireless charging field, and then the controller 130 controls the wireless communication unit 120 to execute the detection function of the wireless communication tag to determine whether the wireless communication tag 30 is also present in the wireless charging field before charging using the power transmission unit 110.

When the wireless communication unit 120 does not detect the wireless communication tag 30, then the controller 130 may control the power transmission unit 110 to start the wireless charging function, and transmit the digital Ping through the transmission coil 111 to wake up the power receiving device 20 and cause the power receiving device 20 to generate a feedback signal, and the controller 130 can identify basic information of the power receiving device in the feedback signal, and establish communication handshake between the power receiving device 20 and the power transmission unit 110 based on the basic information. Next, the controller 130 controls the transmission coil 110 to supply power to the power receiving device 20 at a large power.

When the wireless communication unit 120 detects the wireless communication tag 30, then the controller 130 may control the wireless communication unit 120 to execute other functions to communicate with the wireless communication tag 30. Additionally or alternatively, the controller 130 may also output information indicative of detection of the wireless communication tag 30 to users in order not to allow the power transmission unit 110 to start the suspended wireless charging function before the wireless communication tag 30 is removed.

As is discussed above, since the wireless charging device uses the DD Ping provided in the disclosure, it can prevent a blind zone in detection of the wireless communication tag, avoid the wireless communication tag from being damaged while reducing standby power consumption, and improving a charging response speed.

Although the contents are the embodiments of the disclosure, other and further embodiments of the disclosure also can be designed without departing from basic scope of the disclosure, and the scope of the disclosure is determined by the appended claims.

What is claimed is:

1. A method for detecting a power receiving device in wireless charging, comprising:
   transmitting a detection signal to detect presence of the power receiving device in a wireless charging field, wherein
   the detection signal is configured to wake up the power receiving device in the wireless charging field, and cause the power receiving device to generate a feedback signal based on a modulation wave of about 2 kHz;
   a duration time of the detection signal is greater than 1 millisecond and less than 65 milliseconds; and
   the detection signal is configured to identify the modulation wave.

2. The method according to claim 1, wherein the detection signal does not identify an information content of the feedback signal.

3. A wireless charging method for a wireless charging device, comprising:
   transmitting a first detection signal to detect presence of a power receiving device in a wireless charging field; and
   when the power receiving device is detected in the wireless charging field, detecting presence of a wireless communication tag in the wireless charging field, wherein,
   the first detection signal is configured to wake up the power receiving device in the wireless charging field, and cause the power receiving device to generate a feedback signal based on a modulation wave of about 2 kHz;
   a duration time of the first detection signal is greater than 1 millisecond and less than 65 milliseconds; and
   the first detection signal is configured to identify the modulation wave.

4. The method according to claim 3, wherein the first detection signal does not identify information content of the feedback signal.

5. The method according to claim 3, further comprising:
   periodically transmitting a second detection signal different from the first detection signal before transmitting the first detection signal, to detect presence of an object in the wireless charging field; and
   when the object is detected in the wireless charging field, executing the step of transmitting the first detection signal to determine whether the object is the power receiving device,
   wherein the second detection signal is an analog Ping.

6. The method according to claim 3, wherein,
   periodically transmitting the first detection signal to detect presence of the power receiving device in the wireless charging field.

7. The method according to claim 3, further comprising:
when the wireless communication tag is not detected in the wireless charging field, transmitting a third detection signal to wake up the power receiving device to cause the power receiving device to generate the feedback signal, identifying an information content of the feedback signal, and starting wireless charging function to supply power to the power receiving device, wherein the third detection signal is a digital Ping; and
when the wireless communication tag is detected in the wireless charging field, not starting the wireless charging function until the wireless communication tag is removed.

8. A wireless charging device, comprising:
a power transmission unit having a transmission coil for supplying power to a power receiving device in a wireless charging field;
a wireless communication unit for detecting presence of a wireless communication tag in the wireless charging field, and communicating with the wireless communication tag; and
a controller configured to:
cause the power transmission unit to transmit a first detection signal to detect presence of the power receiving device in the wireless charging field, and
when the power receiving device is detected in the wireless charging field, cause the wireless communication unit to detect presence of the wireless communication tag in the wireless charging field, wherein,
the first detection signal is configured to wake up the power receiving device in the wireless charging field, and cause the power receiving device to generate a feedback signal based on a modulation wave of about 2 kHz;
a duration time of the first detection signal is greater than 1 millisecond and less than 65 milliseconds; and
the first detection signal is configured to identify the modulation wave.

9. The wireless charging device according to claim 8, wherein the first detection signal does not identify an information content of the feedback signal.

10. The wireless charging device according to claim 8, wherein the controller is further configured to:
cause the power transmission unit to periodically transmit a second detection signal before the first detection signal is transmitted, to detect presence of an object in the wireless charging field; and
when the object is detected in the wireless charging field, cause the power transmission unit to transmit the first detection signal to determine whether the object is the power receiving device,
wherein the second detection signal is an analog Ping.

11. The wireless charging device according to claim 8, wherein the controller is further configured to cause the power transmission unit to periodically transmit the first detection signal to detect presence of the power receiving device in the wireless charging field.

12. The wireless charging device according to claim 8, wherein the controller is configured to:
when the wireless communication unit does not detect the wireless communication tag in the wireless charging field, cause the power transmission unit to transmit a third detection signal to wake up the power receiving device and cause the power receiving device generates the feedback signal, identifies the information content of the feedback signal, and start wireless charging function to supply power to the power receiving device, wherein the third detection signal is a digital Ping; and
when the wireless communication unit detects the wireless communication tag in the wireless charging field, prevent the power transmission unit from starting the wireless charging function until the wireless communication tag is removed.

13. The wireless charging device according to claim 12, wherein the controller is configured to:
when the wireless communication unit detects the wireless communication tag in the wireless charging field, output information indicative of detection of the wireless communication tag to users.

14. The wireless charging device according to claim 8, wherein the feedback signal is based on the modulation wave of 2±4% kHz.

15. The wireless charging device according to claim 8, wherein the controller comprises a processor and a memory for storing instructions or programs, and the processor executes the instructions or programs stored in the memory.

* * * * *